US009398310B2

(12) United States Patent
Jiang et al.

(10) Patent No.: US 9,398,310 B2
(45) Date of Patent: Jul. 19, 2016

(54) METHOD AND APPARATUS FOR SUPER-RESOLUTION VIDEO CODING USING COMPRESSIVE SAMPLING MEASUREMENTS

(75) Inventors: Hong Jiang, Warren, NJ (US); Paul A. Wilford, Bernardsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 539 days.

(21) Appl. No.: 13/182,856

(22) Filed: Jul. 14, 2011

(65) Prior Publication Data

US 2013/0016790 A1    Jan. 17, 2013

(51) Int. Cl.
H04N 7/26    (2006.01)
*H04N 19/59*    (2014.01)
*H04N 19/46*    (2014.01)

(52) U.S. Cl.
CPC .............. *H04N 19/59* (2014.11); *H04N 19/46* (2014.11)

(58) Field of Classification Search
CPC ..................... H04N 19/00545; H04N 19/59
USPC .............. 375/240; 348/403; 358/302; 463/43
See application file for complete search history.

(56) References Cited

U.S. PATENT DOCUMENTS

| | | | |
|---|---|---|---|
| 3,775,602 A | 11/1973 | Alexandridis et al. | |
| 5,070,403 A | 12/1991 | Wilkinson | |
| 5,166,788 A | 11/1992 | Lee | |
| 5,262,854 A | 11/1993 | Ng | |
| 5,555,023 A | 9/1996 | Maenaka et al. | |
| 5,572,552 A | 11/1996 | Dent et al. | |
| 5,870,144 A * | 2/1999 | Guerrera | 375/240.2 |
| 5,983,251 A | 11/1999 | Martens et al. | |
| 6,148,107 A | 11/2000 | Ducloux et al. | |
| 6,356,324 B1 | 3/2002 | Nishiguchi et al. | |

(Continued)

FOREIGN PATENT DOCUMENTS

CN    101309404 A    11/2008
CN    101964910 A    2/2011

(Continued)

OTHER PUBLICATIONS

Office Action issued in co-pending U.S. Appl. No. 12/894,757 on Mar. 20, 2013.

(Continued)

*Primary Examiner* — Dave Czekaj
*Assistant Examiner* — Berteau Joisil
(74) *Attorney, Agent, or Firm* — Harness, Dickey & Pierce, P.L.C.

(57) ABSTRACT

Embodiments relate to a method and apparatus for super resolution video coding using compressive measurements. The method includes receiving, by a decoder, a set of measurements, where the set of measurements represents encoded video data having original video data with an original display resolution. The method further includes determining, by the decoder, a display resolution, where the display resolution is higher than the original display resolution, and determining a reduction matrix based on at least a number of pixels for the determined display resolution, where the reduction matrix includes a pattern of values. The method further includes reconstructing, by the decoder, the video data or a portion of the video data using the determined reduction matrix and the received set of measurements such that the original display resolution is enlarged to the determined display resolution.

17 Claims, 5 Drawing Sheets

(56) References Cited

U.S. PATENT DOCUMENTS

| | | | |
|---|---|---|---|
| 6,718,287 B2 | 4/2004 | Oostveen et al. | |
| 6,954,501 B2 | 10/2005 | Skripin et al. | |
| 7,046,853 B2 | 5/2006 | Okada | |
| 7,345,603 B1 | 3/2008 | Wood et al. | |
| 7,680,356 B2 | 3/2010 | Boyce et al. | |
| 8,123,883 B2 | 2/2012 | Llorente Gonzalez et al. | |
| 8,125,883 B2 | 2/2012 | Aulin | |
| 8,204,126 B2 | 6/2012 | Tsuda et al. | |
| 2002/0181789 A1 | 12/2002 | Okada | |
| 2003/0043918 A1 | 3/2003 | Jiang et al. | |
| 2003/0197898 A1* | 10/2003 | Battiato et al. | 358/302 |
| 2004/0264580 A1* | 12/2004 | Chiang Wei Yin et al. | 375/240.25 |
| 2005/0207498 A1 | 9/2005 | Vitali et al. | |
| 2006/0203904 A1 | 9/2006 | Lee | |
| 2006/0239336 A1 | 10/2006 | Baraniuk et al. | |
| 2007/0242746 A1 | 10/2007 | Kishimoto et al. | |
| 2007/0285554 A1 | 12/2007 | Givon | |
| 2008/0025624 A1 | 1/2008 | Brady | |
| 2008/0117968 A1 | 5/2008 | Wang | |
| 2008/0130883 A1 | 6/2008 | Agaian et al. | |
| 2008/0152296 A1 | 6/2008 | Oh et al. | |
| 2009/0052585 A1 | 2/2009 | Song et al. | |
| 2009/0079876 A1* | 3/2009 | Takeshima et al. | 348/699 |
| 2009/0222226 A1 | 9/2009 | Baraniuk et al. | |
| 2009/0316779 A1 | 12/2009 | Fukuhara et al. | |
| 2010/0027897 A1 | 2/2010 | Sole et al. | |
| 2010/0091134 A1 | 4/2010 | Cooke et al. | |
| 2010/0165163 A1 | 7/2010 | Matsuda | |
| 2010/0189172 A1 | 7/2010 | Pateux et al. | |
| 2010/0246952 A1 | 9/2010 | Banner et al. | |
| 2011/0150084 A1 | 6/2011 | Choi et al. | |
| 2011/0150087 A1 | 6/2011 | Kim et al. | |
| 2011/0276612 A1 | 11/2011 | Droz et al. | |
| 2012/0051432 A1* | 3/2012 | Fernandes et al. | 375/240.16 |
| 2012/0063641 A1 | 3/2012 | Venkatesh et al. | |
| 2012/0082208 A1 | 4/2012 | Jiang et al. | |
| 2012/0189047 A1 | 7/2012 | Jiang et al. | |
| 2013/0121422 A1 | 5/2013 | Jiang et al. | |

FOREIGN PATENT DOCUMENTS

| | | |
|---|---|---|
| CN | 102025999 A | 4/2011 |
| JP | 2003069832 A | 3/2003 |
| WO | WO 2009/007580 A2 | 1/2009 |
| WO | WO 2011/081643 A2 | 7/2011 |

OTHER PUBLICATIONS

Office Action issued in co-pending U.S. Appl. No. 12/894,855 on Mar. 4, 2013.
Cossalter M. et al., "Joint Compressive Video Coding and Analysis," IEEE Transactions on Multimedia, IEEE Service Center, Piscataway, NJ, US, vol. 12, No. 3, Apr. 1, 2010, pp. 168-183, XP011346672.
Dadkhan M.R. et al., "Compressive Sensing with Modified Total Variation Minimization Algorithm," Acoustic Speech and Signal Processing (ICASSP), 2010 IEEE International Conference on, IEEE, Piscataway, NJ, USA, Mar. 14, 2010, pp. 1310-1313, XP031697373.
Huihui Bai et al., "Compressive Sensing for DCT Image," Computational Aspects of Social Networks (CASON), 2010 International Conference on, IEEE, Piscataway, NJ, USA, Sep. 26, 2010, pp. 378-381, XP031802282.
Duarte M.F. et al., "Single-Pixel Imaging via Compressive Sampling," IEEE Signal Processing Magazine, IEEE Service Center, Piscataway, NJ, US, vol. 25, No. 2, Mar. 1, 2008, pp. 83-91, XP011225667.
Chengbo Li, "An Efficient Algorithm for Total Variation Regularization with Applications to the Single Pixel Camera and Compressive Sensing," Thesis Submitted in Partial Fulfillment of the Requirements for the Degree Master of Arts, Sep. 30, 2009, pp. 1-93, XP55010819, Retrieved from the internet: URL:http://scholarship.rice.edu/bitstream/handle/1911/62229/1486057.PDF?sequence=1 [Retrieved Oct. 31, 2011].
Chengbo Li et al., "Video Coding Using Compressive Sensing for Wireless Communications," Wireless Communications and Networking Conference (WCNC), 2011 IEEE, IEEE, Mar. 28, 2011, pp. 2077-2082, XP031876593.
Hong Jiang et al., "Arbitrary Resolution Video Coding Using Compressive Sensing," Workshop on Picture Coding and Image Processing 2010, Dec. 7, 2010 XP030082080.
International Search Report dated Nov. 14, 2011 for Application No. PCT/US2011/051726.
Robucci, Ryan, et al., "Compressive Sensing on a CMOS Seperable Transform Image Sensor," pp. 5125-5128, IEEE, 2008.
International Search Report and Written Opinion for PCT/US2011/051730 dated Dec. 15, 2011.
Park and Wakin, "A multiscale framework for compressive sensing of video," in Picture Coding Simposium, Chicago, IL, May 2009.
Drori, Iddo, "Compressed Video Sensing", BMVA symposium on 3D video analysis, display, and applications, 2008.
Wakin et al., "Compressive imaging for video representation and coding", in Picture Coding Symposium, (Beijing, China), Apr. 2006.
Dugad, R. et al., "A Fast Scheme for Image Size Change in the Compressed Domain," IEEE Transactions on Circuits and Systems for Video Technology, vol. 11, No. 4, Apr. 1, 2011.
Deng, C. et al., "Robust image compression based on compressive sensing," Multimedia and Expo (ICME), Jul. 19, 2012, pp. 462-467.
Hyder, M. et al., "A Scalable Distributed Video Coder Using Compressed Sensing," India Conference, Dec. 8, 2009, pp. 1-4.
Gao, D. et al., "A Robust Image Transmission Scheme for Wireless Channels Based on Compressive Sensing," Aug. 18, 2012, pp. 334-341.
International Search Report dated Feb. 29, 2012.
CCD and CMOS sensor technology, 2010, Axis Communications, pp. 1-8.
Jan Bogaerts et al., High-End CMOS Active Pixel Sensors for Space-Borne Imaging Instruments, 2005, FillFactory. pp. 1-9.
Roger William Doering, A Tricolor Digital/Micromirror Video Chip, 2001, UCLA, pp. 1-180.
Tarek Ouni et al., New low complexity DCT based video compression method, 2009, ICT 09, pp. 202-207.
R. Turchetta et al., Monolithic active pixel sensor (MAPS) in VLSI CMOS technology, 2003, Science Direct, pp. 1-9.
Sahng-Gyu Partk, Adaptive Lossless Video Compression, 2003, Purdue University, pp. 1-105.
Office Action dated Oct. 1, 2012 for co-pending U.S. Appl. No. 12/894,855.
Office Action dated Nov. 21, 2012 for co-pending U.S. Appl. No. 12/894,807.
Office Action dated Dec. 4, 2012 for co-pending U.S. Appl. No. 12/894,757.
Translation of Japanese Office Action dated Feb. 25, 2014 in Japanese Application No. 2013-531973, which corresponds to co-peding U.S. Appl. No. 12/894,807.
Office Action dated Jun. 18, 2014 in related U.S. Appl. No. 13/213,743.
Office Action dated Apr. 14, 2014 in related U.S. Appl. No. 12/894,807.
Notice of Allowance dated Apr. 17, 2014 in related U.S. Appl. No. 12/894,757.
Office Action dated Jul. 9, 2014 in copending U.S. Appl. No. 13/213,762.
Notice of Allowance dated Sep. 12, 2014 in copending U.S. Appl. No. 12/894,757.
Office Action dated Oct. 24, 2014 in related U.S. Appl. No. 12/894,807.
Final Office Action dated Dec. 10, 2014 in related U.S. Appl. No. 13/213,743.
Final Office Action dated Dec. 4, 2014 in related U.S. Appl. No. 13/213,762.
U.S. Final Office Action dated May 13, 2013, for U.S. Appl. No. 12/894,807.
U.S. Office Action dated Sep. 25, 2013, for U.S. Appl. No. 12/894,757.
U.S. Office Action dated May 29, 2015, for U.S. Appl. No. 13/213,743.

(56) References Cited

OTHER PUBLICATIONS

U.S. Office Action dated Jun. 4, 2015, for U.S. Appl. No. 13/213,762.
Notice of Allowance dated Sep. 30, 2013, in copending U.S. Appl. No. 12/894,855.
Notice of Allowance dated Nov. 20, 2014, in copending U.S. Appl. No. 12/894,757.
Written Opinion of the International Searching Authority for PCT/US2011/051726 dated Nov. 14, 2011.
International Preliminary Report on Patentability for PCT/US2011/051726 dated Apr. 2, 2013.
International Preliminary Report on Patentability for PCT/US2011/051730 dated Apr. 2, 2013.
Written Opinion of the International Searching Authority for PCT/US2011/056088 dated Feb. 29, 2012.
International Preliminary Report on Patentability for PCT/US2011/056088 dated Apr. 2, 2013.
International Search Report for PCT/US2014/066035 dated Feb. 26, 2015.
Written Opinion of the International Searching Authority for PCT/US2014/066035 dated Feb. 26, 2015.
Chinese Office Action dated Jun. 3, 2015, in Chinese Application No. 201180047658.2, corresponding to U.S. Appl. No. 12/894,807.
L.R. Rabiner and B. Gold, Theory and Application of Digital Signal Processing, ch. 6, sec. 6.17, pp. 393-399. Prentice Hall, 1975.
Huang, Gang et al. "Lensless Compressive Sensing Imaging," Jan. 2013, pp. 1-12.
Narayanan, S. et al., "Camera Motion Estimation using Circulant Compressive Sensing Matrices", 2013 $9^{th}$ International Conference on Information, Communications & Signal Processing, IEEE, Dec. 10, 2013, pp. 1-5 (XP032584530).
Majumdar, A., "A sparsity based approach towards fast MRI acquisition", Jul. 19, 2012 (XP055123105).
Willett, R. M. et al., "Compressed sensing for practical optical imaging systems: a tutorial", SPIE, Optical Engineering, vol. 50, No. 7, Jul. 6, 2011, pp. 1-13 (XP040561676).
U.S. Final Office Action dated Oct. 5, 2015, for U.S. Appl. No. 12/894,807.

* cited by examiner

METHOD AND APPARATUS FOR SUPER-RESOLUTION VIDEO CODING USING COMPRESSIVE SAMPLING MEASUREMENTS

BACKGROUND

Super-resolution refers to higher resolution images constructed from lower resolution originals. In video, different frames may be regarded as different representations of the same scene, and therefore, it is possible to have a better picture of the scene by fusing at least two adjacent frames.

Conventional methods obtain super resolution by processing video data in the pixel domain. For instance, when a decoder receives compressed video data, the decoder of the conventional art processes the compressed video data in two steps: 1) decompress the video data, and 2) process the decompressed video to obtain super-resolution. However, the two step conventional process in high complexity.

SUMMARY

Embodiments relate to a method and apparatus for super resolution video coding using compressive measurements.

The method includes receiving, by a decoder, a set of measurements, where the set of measurements represents encoded video data having original video data with an original display resolution. The method further includes determining, by the decoder, a display resolution, where the display resolution is higher than the original display resolution, and determining a reduction matrix based on at least a number of pixels for the determined display resolution, where the reduction matrix includes a pattern of values. The method further includes reconstructing, by the decoder, the video data or a portion of the video data using the determined reduction matrix and the received set of measurements such that the original display resolution or a portion of the original video data is enlarged to the determined display resolution.

In one embodiment, the determining the display resolution step determines the display resolution according to requirements of a video display screen. The original display resolution may be a common intermediate format (CIF) resolution and the determined display resolution may be a video graphics array (VGA) resolution.

In one embodiment, the reduction matrix has size N×P, and a value of N corresponds to a number of pixels for the original display resolution and a value of P corresponds to the number of pixels for the determined display resolution. If the reconstruction step reconstructs the video data using the determined display resolution, the determining a reduction matrix step determines the pattern of values for the reduction matrix based on a discrete cosine transform (DCT) of the original video data and a first identity matrix having the size N×P. The first identity matrix having the size N×P is formed by removing last P–N rows of a second identity matrix having size P×P.

Alternatively, if the reconstruction step reconstructs the portion of the video data using the determined display resolution, the determining a reduction matrix step determines the pattern of values for the reduction matrix based on a discrete cosine transform of the original video data having size $N_o \times N_o$ and a first identity matrix having size $N_z \times P_z$, where a value of $N_o$ corresponds to a number of pixels for a portion of the original video data not to be reconstructed according to the determined display resolution, a value of $N_z$ corresponds to a number of pixels for a portion of the original video data to be reconstructed according to the determined display resolution, and $P_z$ corresponds to a number of pixels of the portion of the video data to be reconstructed according to the determined display resolution. The first identity matrix having the size $N_z \times P_z$ is formed by removing last $P_z - P_n$ rows of a second identity matrix of size $P_z \times P_z$.

The method may further include obtaining, by the decoder, a measurement matrix that was applied to the video data at an encoder, where the measurement matrix includes an assigned pattern of pixel values, and calculating, by the decoder, pixel values for the determined display resolution based on the measurement matrix, the reduction matrix and the received set of measurements.

The apparatus for decoding video data includes a decoder configured to receive a set of measurements, where the set of measurements represents encoded video data, and the encoded video data includes original video data with an original display resolution. The decoder is configured to determine a display resolution, where the display resolution is higher than the original display resolution. The decoder is configured to determine a reduction matrix based on at least a number of pixels for the determined display resolution, where the reduction matrix includes a pattern of values. The decoder is configured to reconstruct the video data or a portion of the video data using the determined reduction matrix and the received set of measurements such that the original display resolution or a portion of the original video data is enlarged to the determined display resolution.

In one embodiment, the decoder determines the display resolution according to requirements of a video display screen. The original display resolution may be a common intermediate format (CIF) resolution and the determined display resolution may be a video graphics array (VGA) resolution.

The reduction matrix has size N×P, and a value of N corresponds to a number of pixels for the original display resolution and a value of P corresponds to the number of pixels for the determined display resolution.

If the decoder reconstructs the video data using the determined display resolution, the decoder determines the pattern of values for the reduction matrix based on a discrete cosine transform (DCT) of the original video data and a first identity matrix having the size N×P. The first identity matrix having the size N×P is formed by removing last P–N rows of a second identity matrix having size P×P.

Alternatively, if the decoder reconstructs the portion of the video data using the determined display resolution, the decoder determines the pattern of values for the reduction matrix based on a discrete cosine transform of the original video data having size $N_o \times N_o$ and a first identity matrix having size $N_z \times P_z$, where a value of $N_o$ corresponds to a number of pixels for a portion of the original video data not to be reconstructed according to the determined display resolution, a value of $N_z$ corresponds to a number of pixels for a portion of the original video data to be reconstructed according to the determined display resolution, and a value of $P_z$ corresponds to a number of pixels of the portion of the video data to be reconstructed according to the determined display resolution. The first identity matrix having the size $N_z \times P_z$ is formed by removing last $P_z - P_n$ rows of a second identity matrix of size $P_z \times P_z$.

Also, the decoder is configured to obtain a measurement matrix that was applied to the video data at an encoder, where the measurement matrix includes an assigned pattern of pixel values. The decoder is configured to calculate pixel values for the determined display resolution based on the measurement matrix, reduction matrix and the received set of measurements.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Various embodiments of the present disclosure will now be described more fully with reference to the accompanying drawings. Like elements on the drawings are labeled by like reference numerals.

As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The embodiments will now be described with reference to the attached figures. Various structures, systems and devices are schematically depicted in the drawings for purposes of explanation only and so as not to obscure the present disclosure with details that are well known to those skilled in the art. Nevertheless, the attached drawings are included to describe and explain illustrative examples of the embodiments. The words and phrases used herein should be understood and interpreted to have a meaning consistent with the understanding of those words and phrases by those skilled in the relevant art. To the extent that a term or phrase is intended to have a special meaning, i.e., a meaning other than that understood by skilled artisans, such a special definition will be expressly set forth in the specification that directly and unequivocally provides the special definition for the term or phrase.

Co-pending application Ser. No. 12/894,807 filed September 2010, which is incorporated by reference in its entirety, discloses an apparatus and method in which encoded video data using compressive sensing may be decoded to any arbitrary resolution lower than the resolution of the original video. The embodiments of the present disclosure provide an apparatus and method in which encoded video data using compressive sensing may be decoded to an arbitrary resolution higher than the original video. Higher resolution video may provide a sharper and clearer picture for viewers. Also, higher resolution video may help identify objects in a video in forensic analysis. According to the embodiments, the super-resolution video data may be obtained during the process of reconstructing the video data from the compressive measurements, as further explained below.

At the encoder, compressive measurements are made on video data having an original display resolution. The measurements from the video data of the original resolution are transmitted in a network, wired or wireless. When received by a decoder, the measurements are used to reconstruct the video data at a resolution higher than the original resolution. The first part of this disclosure describes encoding video data using compressive measurements, and then transmitting a set of measurements representing the video data having the original display resolution. The second part of this disclosure describes decoding the encoded video data by reconstructing the video data according to an enlarged display resolution.

Figure 1:
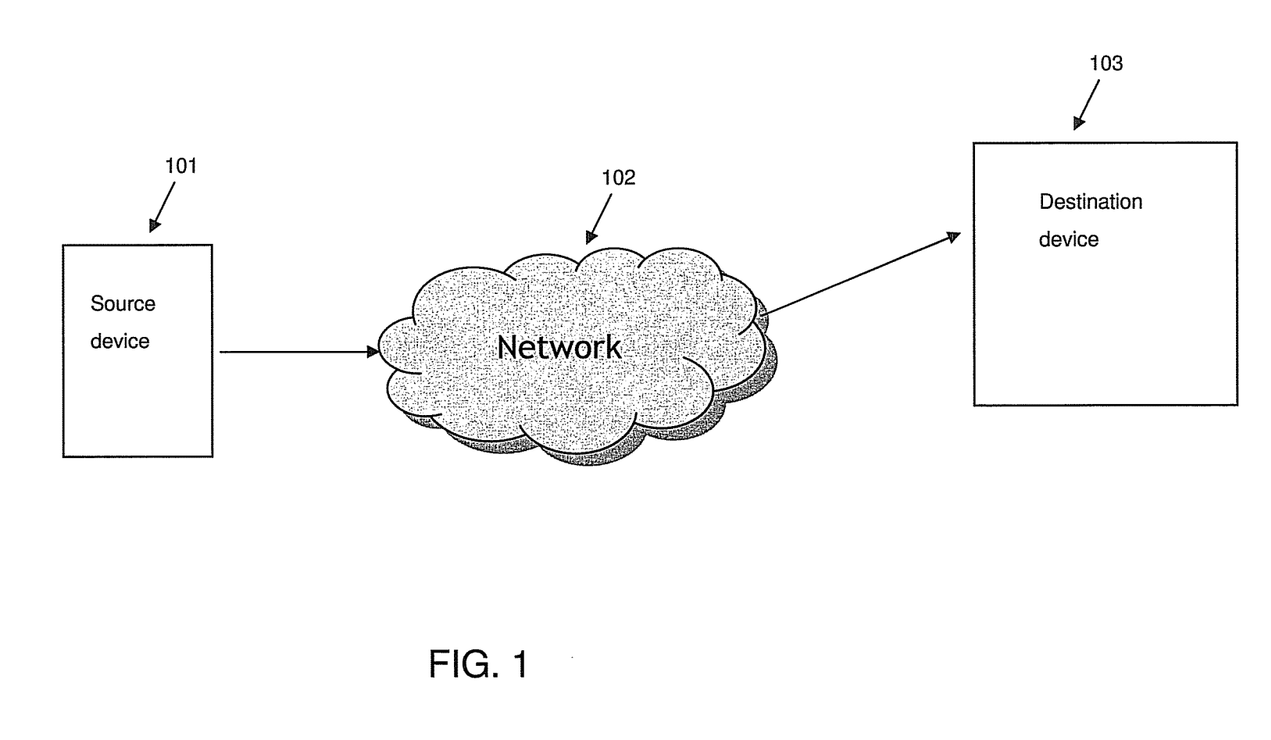
FIG. 1 illustrates a communication network according to an embodiment.

FIG. 1 illustrates a communication network according to an embodiment. The communication network includes at least one source device 101 for acquiring, encoding and/or transmitting video data, a network 102 supporting a video transmission application, and at least one destination device 103 for receiving, decoding and/or displaying the received video data. The network 102 may be any known transmission, wireless or wirelined, network. For example, the network 102 may be a wireless network which includes a radio network controller (RNC), a base station (BS), or any other known component necessary for the transmission of video data over the network 102 from one device to another device. The video transmission application part of the network 102 may include Digital Video Broadcasting-Handheld (DVB-H), Digital Video Broadcasting-Satellite services to Handhelds (DVB-SH), Long Term Evolution (LTE) or evolved Multimedia Broadcast and Multicast Services (eMBMS), for example. One device may transmit video information to another device via a dedicated or shared communication channel.

The source device 101 may be any type of device capable of acquiring video data and encoding the video data for transmission via the network 102 such as personal computer systems, camera systems, mobile video phones, smart phones, or any type of computing device that may connect to the network 102, for example. Each source device 101 includes at least one processor, a memory, and an application storing instructions to be carried out by the processor. The acquisition, encoding, transmitting or any other function of the source device 101 may be controlled by at least one processor. However, a number of separate processors may be provided to control a specific type of function or a number of functions of the source device 101. The implementation of the controller(s) to perform the functions described below is within the skill of someone with ordinary skill in the art.

The destination device 103 may be any type of device capable of receiving, decoding and displaying video data such as personal computer systems, mobile video phones, smart phones or any type of computing device that may receive video information from the network 102. The receiving, decoding, and displaying or any other function of the destination device 103 may be controlled by at least one processor. However, a number of separate processors may be provided to control a specific type of function or a number of functions of the destination device 103. The implementation of the controller(s) to perform the functions described below is within the skill of someone with ordinary skill in the art.

Figure 2:
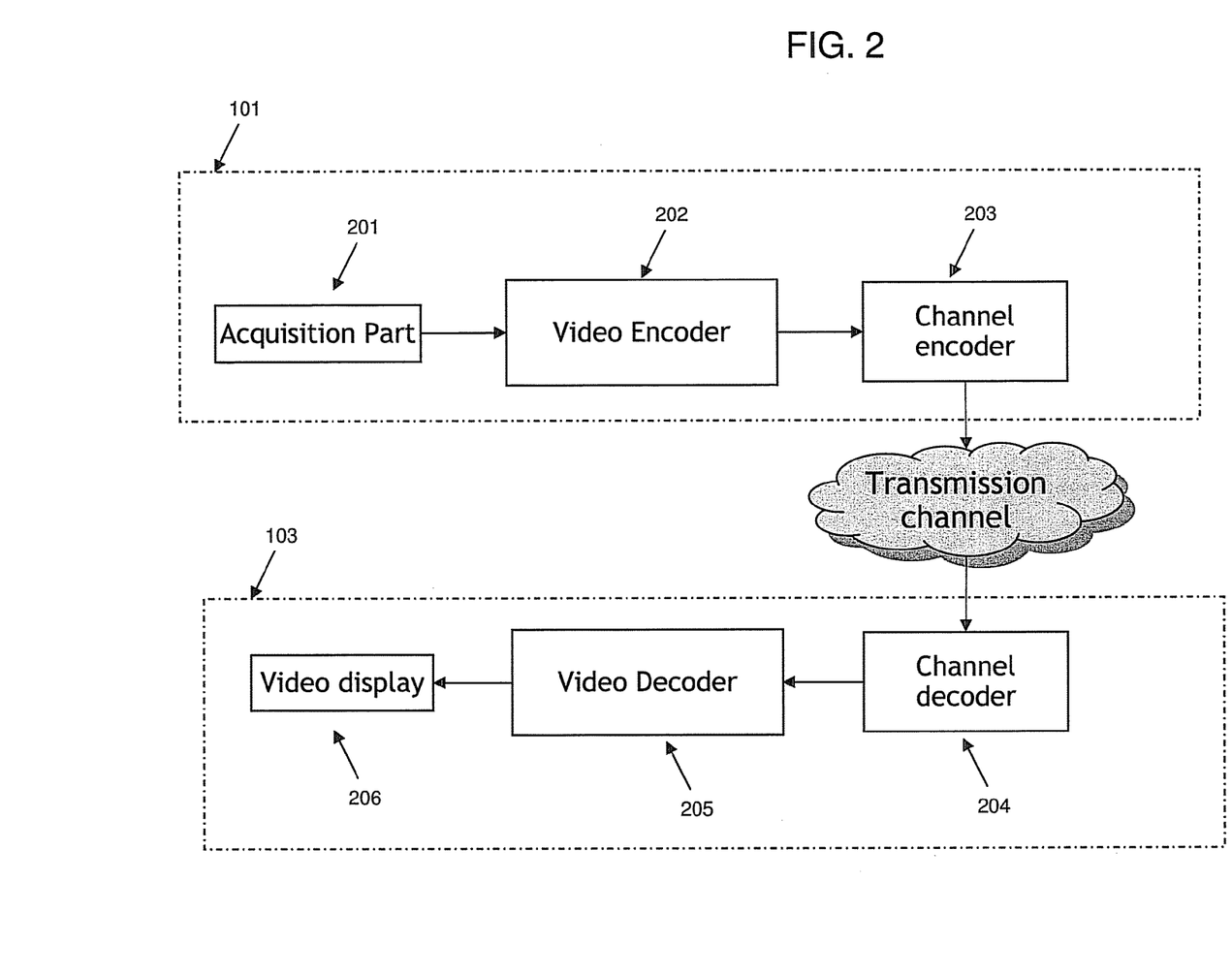
FIG. 2 illustrates components of a source device and destination device according to an embodiment.

FIG. 2 illustrates components of the source device 101 and the destination device 103 according to an embodiment. For example, the source device 101 includes an acquisition part 201, a video encoder 202, and a channel encoder 203. In addition, the source device 101 may include other components that are well known to one of ordinary skill in the art. Referring to FIG. 2, the acquisition part 201 acquires video data from a video camera component included in the source device 101 or connected to the source device 101. Also, the source device 101 may acquire video data from any type of computer-readable medium such as optical disks and/or any type of memory storage unit. The acquisition of video data may be accomplished according to any well known methods.

According to an embodiment, the video encoder 202 encodes the acquired video data using compressive measurements to generate a set of measurements, which represents the encoded video data. For example, the video encoder 202 may apply a set of measurement bases to the original video data in its original form or a modified temporal structure such as video cubes, tubes or any type of video structure to generate a set of measurements to be stored on a computer-readable medium such as an optical disk or storage unit or to be transmitted to the destination device 103. The video encoder 202 is further explained with reference to FIG. 3. It is also possible to combine the functionality of the acquisition part 201 and the video encoder 202 into one unit, as described in application Ser. No. 12/894,855 filed Sep. 30, 2010, which is incorporated by reference in its entirety. Also, it is noted that the acquisition part 201, video encoder 202 and channel encoder 203 may be implemented in two or any number of units.

Using the set of measurements, the channel encoder 203 codes the measurements to be transmitted in the communication channel. For example, the measurements are quantized to integers. The quantized measurements are packetized into transmission packets. Additional parity bits are added to the packets for the purpose of error detection and/or error correction. It is well known in the art that the measurements thus coded can be transmitted in the network 102. Next, the source device 101 may transmit the encoded video data to the destination device via the communication channel of the network 102.

The destination device 103 includes a channel decoder 204, a video decoder 205, and a video display 206. The destination device 103 may include other components that are well known to one of ordinary skill in the art.

The channel decoder 204 decodes the data received from communication channel. For, example, the data from the communication channel is processed to detect and/or correct errors from the transmission by using the parity bits of the data. The correctly received packets are unpacketized to produce the quantized measurements made in the video encoder 202. It is well known in the art that data can be packetized and coded in such a way that a received packet at the channel decoder 204 can be decoded, and after decoding the packet can be either corrected, free of transmission error, or the packet can be found to contain transmission errors that cannot be corrected, in which case the packet is considered to be lost. In other words, the channel decoder 204 is able to process a received packet to attempt to correct errors in the packet, and to determine whether or not the processed packet has errors, and to forward only the correct measurements from an error free packet to the video decoder 205.

The video decoder 205 determines a display resolution that is higher than the original display resolution of the encoded video data. The term "super resolution" refers to a display resolution that is higher than the original display resolution of the encoded video data. For example, the video decoder 205 may determine the super resolution according to the display requirements of the destination device 103, which may be capable of displaying the video data in a super display resolution. For example, if the measurements are made on original video of Common Intermediate Format (CIF) resolution (i.e., 352×288), and if the decoder needs to support a display of Video Graphics Array (VGA) resolution (i.e.,640×480), the super-resolution reconstruction is used to reconstruct a video with the resolution of 640×480 from the measurements that are made on the video of resolution 352×288.

Also, the video decoder 205 may determine the super resolution for a region of the video data. In other words, the video decoder 205 may determine the super resolution in a certain region in a frame of the video data. For example, there may be a need to zoom into a region of a video frame to view more details. In this case, the region to be zoomed is reconstructed with a resolution higher than the original resolution. For example, the video decoder 205 may support a display of CIF resolution (i.e., 352×288) with measurements made on the video source of the same resolution (i.e., 352×288). However, it may be desired to zoom in to a region of size 176×144. In this case, the video decoder 205 reconstructs a video having resolution 352×288 from the portion of the original video data having size 176×144. Super-resolution, in this case, refers to the reconstructed video of resolution 352×288 which represents the video content of size 176×144 in the original video source.

The video display 206 may be a video display screen of a particular size. The video display 206 may be included in the destination device 103, or may be connected (wirelessly, wired) to the destination device 103. The destination device 103 displays the decoded video data on the video display 206 of the destination device 103 according to the determined super display resolution size. Also, the destination device 103 may display part of the video data having the original display resolution on the video display 206 and display another part of the video data having the determined super display resolution size. Also, it is noted that the video display 206, the video decoder 205 and the channel decoder 204 may be implemented in one or any number of units.

Figure 3:
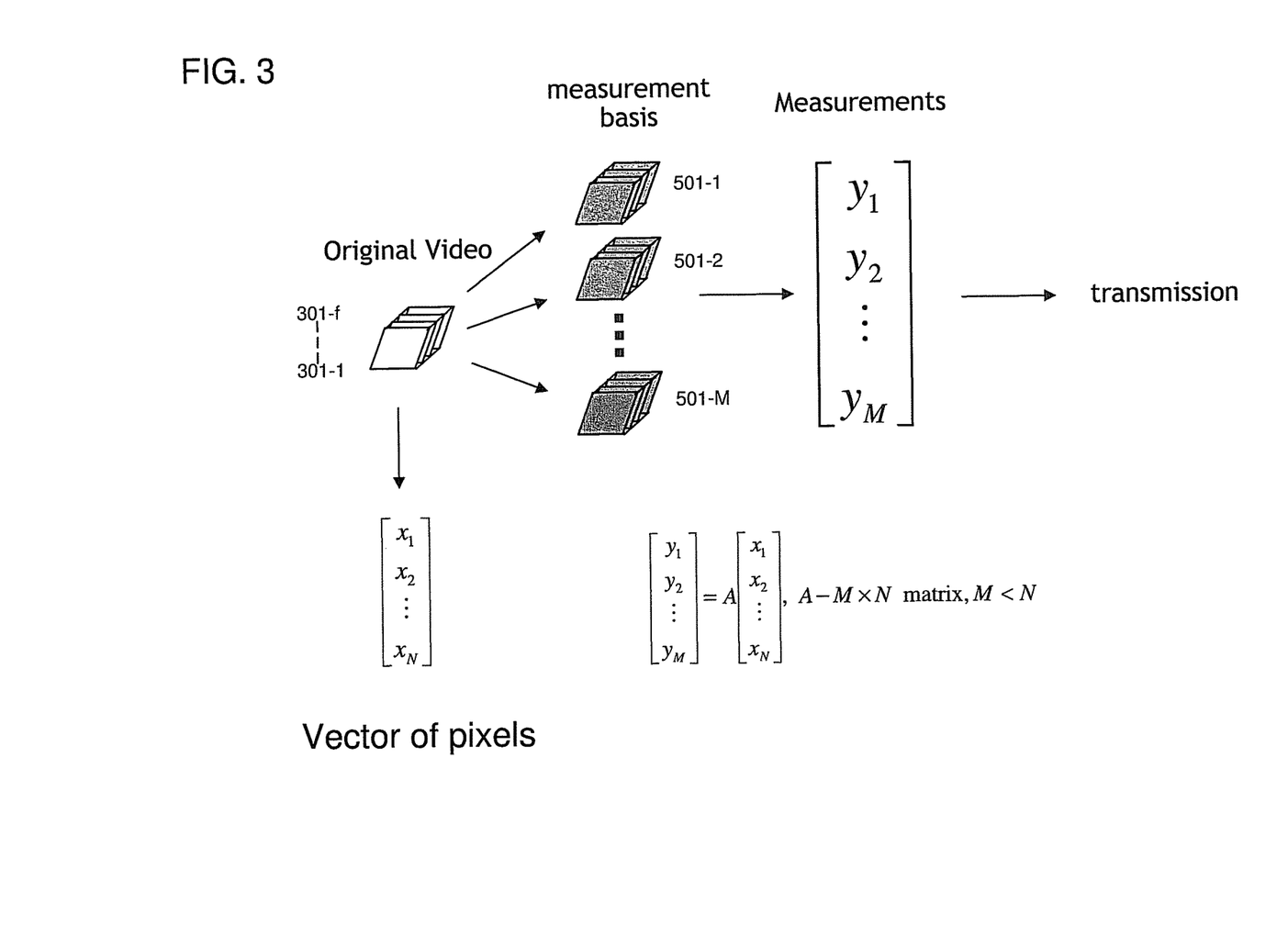
FIG. 3 illustrates an encoding process that applies a set of measurement bases to the video data according to an embodiment.

FIG. 3 illustrates a method of encoding the acquired video data using compressive measurements by the video encoder 202 according to an embodiment.

The original video data includes a number of consecutive frames 301-1 to 301-*f*, where f is the number of frames which may be any integer. Each frame 301 of the video data has size c×r, where c and r are the numbers of horizontal and vertical pixels in each frame. Also, the video encoder 202 may convert the original video frames 301 into a structure different than the structure of the video frames 301. For instance, the video encoder 202 may form the original video frames 301 into different temporal structure. For example, the temporal structure may include a sub-block of video data extracted from each frame in a number of consecutive frames. The temporal structure may be one of video cubes or video tubes, as further explained below. The temporal structure of the video data is further explained in application Ser. No. 12/894,757, which is incorporated by reference in its entirety.

In the case of video cubes, the video encoder 202 extracts a 2-D non-overlapping block of video data from each of the video frames 301 in the number of consecutive frames 301-1 to 301-*f*. The 2-D non-overlapping block represents a sub-region of each video frame. Each block for each frame 301 may have the same number of pixels and the blocks may be extracted from the same location in each of the consecutive frames 301. The video encoder 202 fauns the video cube by stacking each extracted block to form a three dimensional (3-D) video structure. Encoding is performed cube by cube on all video cubes that comprises the received video data.

In the case of video tubes, the video encoder 202 extracts a non-overlapping 2-D block of video data from at least one video frame 301 in a group of pictures (GOP). For example, the video tube includes non-overlapping 2-D blocks extracted from the video frames 301, which may follow the motion trajectory of a particular object in the GOP. The object may be a meaningful object in the video image such as an image of a person as he moves through the video frames 301 of the GOP. Each video tube may include extracted blocks that have different shapes and sizes, and may have different locations within their respective frames. Also, different video tubes may include a different number of frames. The video encoder 202 forms the video tubes by stacking each extracted block to form a 3-D video structure. Encoding is performed tube by tube on all video tubes that comprises the received video data.

The video encoder 202 applies a set of measurement bases to the temporal structure of the video data. For example, the video encoder 202 applies a set of measurement bases 501-1 to 50-M to the video frames 301 to obtain a set of measurements $y_1$ to $y_M$. Variable M may be any integer greater or equal to 1. Each value of y represents a compressive measurement. A number of measurement bases M applied to the video frames 301 corresponds to a number of measurements M. A description of how compressive measurements are calculated is explained below.

First, the video encoder 202 scans the pixels of the video frames 301 to obtain vector $x \in R^N$, which is a 1-D representation of the video frames 301 comprising the video data, where $N=c \times r \times f$ is the length of the vector x. The vector x includes the pixel values of the video frames 301, which is arranged as $[x_1\ x_2\ \ldots\ x_N]$. As shown in FIG. 3, the 1-D representation vector x may be multiplied by measurement matrix A to obtain the set of measurements $y_1$ to $y_M$. The measurement matrix A includes an assigned pattern of pixel values. Each row of the measurement matrix A represents a separate measurement basis. For instance, the measurement matrix A is graphically represented by the set of measurement bases 501-1 to 501-M. The measurement matrix A may be interchangeably used with the set of measurements 501-1 to 501-M. The length of vector x is m, which is also the number of pixels in the video frames 301.

The values of the measurement matrix A may be constructed using randomly permulated Walsh-Hadamard matrix. However, the embodiments encompass any type of matrix for use as the measurement matrix A. As such, the M compressive measurements of vector x is the vector $y \in R^M$ defined by y=Ax. Measurement matrix A has dimension M×N, where M is the number of measurements, and N is the length of the vector x, i.e., N is the number of pixels in the video frames 301. Furthermore, the measurement matrix A may be constructed using Kronecker products, which is described in application Ser. No. 12/894,807.

The video encoder 202 outputs the set of measurements $y_1$ to $y_M$ to the channel encoder 203. The channel encoder 203 encodes the set of measurements $y_1$ to $y_M$ for transmission to the destination device 103 in a manner that was previously described. Next, the source device 101 transmits the set of measurements $y_1$ to $y_M$ to the destination device 103 via the communication channel of the network 102.

The channel decoder 204 of the destination device 101 decodes the transmission, and forwards the correctly received measurements to the video decoder 205 in a manner that was previously described above.

The video decoder 205 determines the super display resolution according to the type of display area of the destination device. For example, if the measurements are made on original video data of CIF resolution (352×288), and if the video decoder 205 needs to support a display of VGA resolution (640×480), the super-resolution reconstruction is used to reconstruct a video with the resolution of 640×480 from the measurements that are made on the video data of resolution 352×288.

Also, the video decoder 205 may determine the super resolution for a portion of the original video data. For example, there may be a need to zoom into a region of a video frame to view more details. In this case, the region to be zoomed needs to be reconstructed with a resolution higher than the original resolution. For example, the video decoder 205 may support a display of CIF resolution (352×288) with measurements made on the video source of the same resolution (352×288). However, it may be desired to zoom in to a region of size 176×144. In this case, as explained above, the video decoder 205 reconstructs a video of resolution 352×288 from the portion of original video of size 176×144. The super-resolution, in this case, refers to the reconstructed video of resolution 352×288 which represents the video content of size 176×144 in the original video source.

Figure 4:
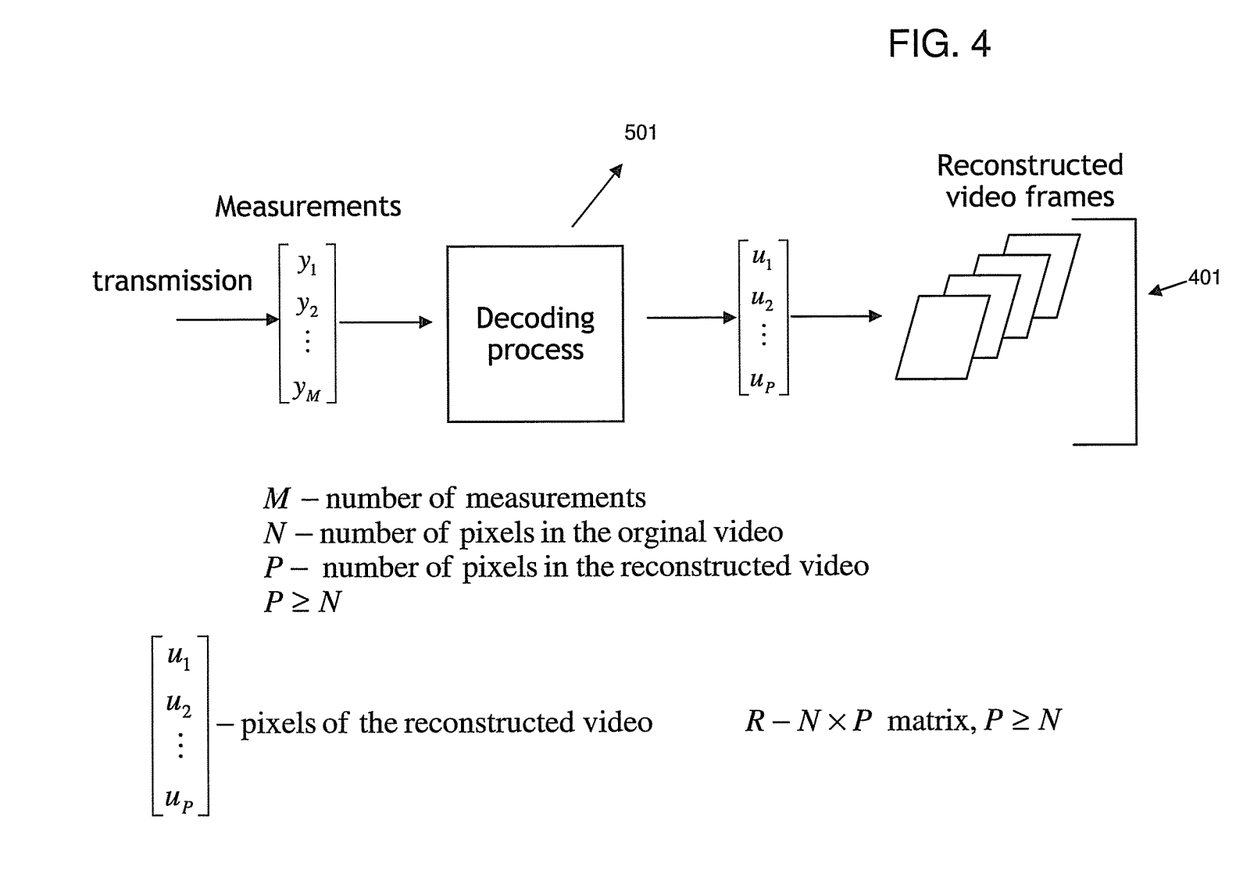
FIG. 4 illustrates a reconstruction process by the video decoder 205 according to an embodiment.

FIG. 4 illustrates a reconstruction process by the video decoder 205 according to an embodiment. The video decoder 205 receives a set of correctly received measurement of the set of measurements $y_1$ to $y_M$. The video decoder 205 determines the super display resolution to reconstruct the video data. Let the total number of pixels in the reconstructed super resolution video data such as a super resolution video cube or tube be an integer P, where P≥N. The video decoder 205 calculates pixel values $[u_1, u_2 \ldots u_p]$ for the reconstructed video data in the determined super display resolution according to a decoding process 501, which uses an reduction matrix R. The reduction matrix R includes a pattern of values. The reduction matrix R may be an operator which maps the pixels of the super-resolution video data to the pixels of a video that has the same resolution as the original video from which the measurements are made.

For example, the reduction matrix R is constructed as an N×P matrix, where a value of N is the number of pixels in the original video data, and a value of P is the number of pixels in the reconstructed video data having the super resolution. The value of P may be greater than or equal to the value of N. The video decoder 205 then reconstructs the video frames 401 based on at least the reduction matrix R and the set of received measurements such that the original display resolution is enlarged to the determined super display resolution, as further explained below.

Figure 5:
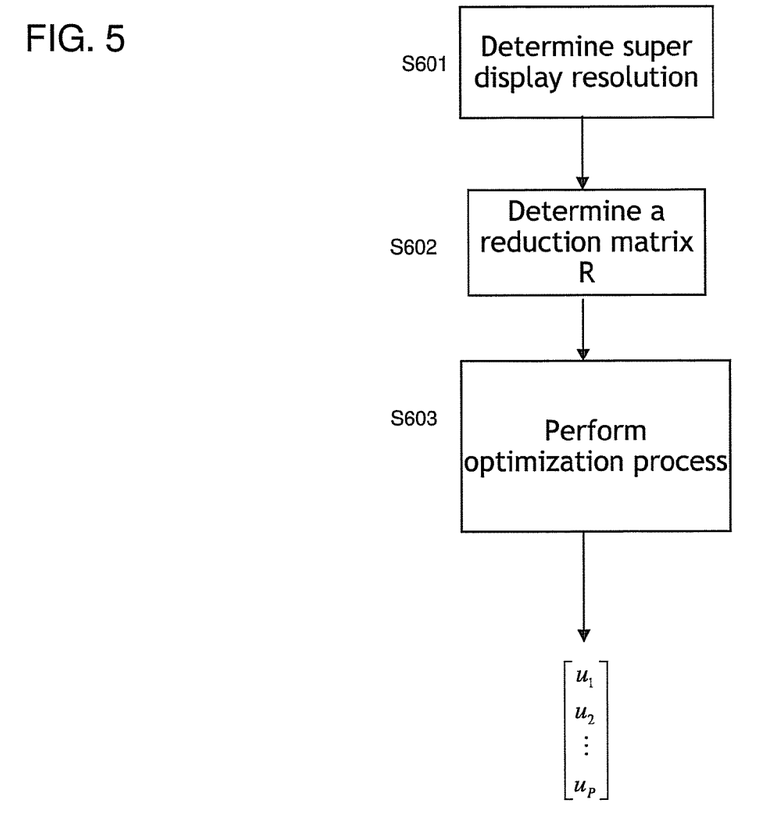
FIG. 5 illustrates a method for decoding the received measurements by the video decoder according to an embodiment.

FIG. 5 illustrates a method for decoding the received measurements by the video decoder 205 according to an embodiment.

In S601, the video decoder 205 determines the video display resolution to reconstruct the encoded video data or a portion of the encoded video data according to the type of the video display 206 as previously described. For example, the video decoder 205 may determine the size of the video display 206, and then enlarge the original video, or a portion of it, to fit the size of the video display 206.

In S602, the video decoder 205 determines a reduction matrix R to be used in the optimization process of step S603. The reduction matrix R is based on at least a number of pixels for the determined super display resolution. For example, as indicated above, the reduction matrix R is an N×P matrix, where a value of N is the number of pixels in the original video data, and a value of P is the number of pixels in the reconstructed video data that has the determined super display resolution.

The reduction matrix R includes a pattern of values, which may be determined by using a resizing method. For example, in one example, the pattern of values of the reduction matrix R represent a low path filter. In other words, the reduction matrix R may represent the process of lowpass filtering and down-sampling, for example, by taking pixel averages, or using a poly-phase filter. The reduction matrix R may also be construct from a two dimensional (2D) spatial discrete cosine transform (DCT) or wavelet transform of the original video frames by using only low frequency components.

As an example, a reduction matrix R can be constructed by using the DCT transform. Let $D_n$ be the n×n matrix representing the DCT transform of size n, and $I_{N \times P}$ be the N×P matrix obtained from the P×P identity matrix by removing the last P−N rows of the identity matrix having size of P×P. Then a reduction matrix is given by $$R = D_N^T I_{N \times P} D_P \qquad \text{Equation 0:}$$

In the case where the super resolution is used for zooming into a portion of the original video data, the reduction matrix can be constructed as follows. First, the vector of the pixels of the original video x is rearranged in two portions: the portion without zooming, $x_O$, and the portion in which zooming is needed $x_Z$. Therefore, the vector of the pixels of the original video data can be written as $x = [x_O^T x_O^T]^T$, where $x_O$ has length $N_O$, and $x_Z$ has length $N_Z$, and $N = N_O + N_Z$. Also, let the pixels of the reconstructed super resolution video be rearranged as $u = [u_O^T u_Z^T]^T$, where $u_O$ has length $N_O$, same as $x_O$, and $u_Z$ has length $P_Z \geq N_Z$. In other words, the portion of original video, $x_Z$, which has $N_Z$ pixels is zoomed to video $u_z$ having a total number of $P_Z$ pixels. The resolution of the other portion of the original video, $x_O$, remains unchanged after reconstruction, i.e., $u_O$ has the same number of pixels as $x_O$. The total number of pixels in the reconstructed video is $P = N_O + P_Z$. Then the reduction matrix R can be constructed from the following block diagonal matrix $$R = \begin{bmatrix} I_{N_O \times N_O} & 0 \\ 0 & R_{N_Z \times P_Z} \end{bmatrix}$$

In above equation, $I_{N_O \times N_o}$ is the $N_O \times N_O$ identity matrix, and $R_{N_O \times P_z}$ is a reduction matrix of size $N_Z \times P_Z$. The matrix $R_{N_z \times P_z}$ is a reduction matrix to map a video of $P_Z$ pixels to a video of $N_Z$ pixels, and $R_{N_z \times P_z}$ may be constructed from DCT as previously described in Equation 0.

In S603, the video decoder 205 calculates the pixel values $[u_1, u_2 \ldots u_p]$ for the super display resolution according to a minimization equation that uses the determined reduction matrix R and the received measurements, as further explained below.

For example, the video decoder 205 solves one of the following minimization equations for the pixel values of the reconstructed video data having the super resolution display, which is performed by a minimization of two-dimensional (2D) total variation (e.g., a TV function) of 1-dimensional (1D) DCT coefficients in the time domain.

$$\min_u TV_2(DCT_t(u)), \text{ subject to } y = ARu, \text{ or} \qquad \text{Equation 1}$$

$$\min_u TV_2(DCT_t(u)) + \frac{\mu}{2}\|ARu - y\|_2^2 \qquad \text{Equation 2}$$

In both equations, y is the available measurements for the set of measurements $y_1$ to $y_M$, and A is the measurement matrix, i.e., 501-1, 501-M, u is the vector $[u_1 u_2 \ldots u_P]$, which provides the pixel values for the reconstructed video frames having the super display resolution, R is the reduction matrix R as previously described. The decoder 205 obtains the measurement matrix A that was applied to the video data at the encoder 202. For example, the measurement matrix A may be obtained based on information that was transmitted from the source device 101, or maybe be obtained from a storage unit that stores the measurement matrix A. The variable μ is the penalty parameter. The value of the penalty parameter is a design choice. $DCT_t(u)$ is a 1-D DCT transform in the time domain, and $TV_2(z)$ is a 2-D total variation function, where z represents the results of the 1-D DCT function. The decoder 205 solves values of u using either Equation 1 or Equation 2, which is the pixel values for the reconstructed video data having the super display resolution.

Equation 2 is an alternative way of expressing Equation 1. However, the video decoder 205 may implement either Equation 1 or Equation 2 according to methods that are well known. For example, an appropriate solver such as the alternate direction augmented Lagrangian method may be used to implement the above-identified minimization equations. A Lagrange method provides a strategy for finding the maxima and minima of a function subject to constraints.

Therefore, the video decoder 205 computes the pixel values for the super display resolution according to one of the minimization equations described above, which uses the determined reduction matrix R, the received measurements and the measurement matrix A.

The video decoder 205 reconstructs the video data according to the total variation (TV) of a discrete cosine transform (DCT) coefficients of candidate video data. The candidate video data is based on the measurement matrix A, the reduction matrix R and the received measurements. For example, in y=ARu, the received measurements y and the measurement matrix A are known. The reduction matrix R has been previously determined.

The creation of Equation 1 and Equation 2 is further described below.

For example, the minimization problem may also be characterized as:

$$\min_u \Phi(u) \text{ subject to } y = ARu, \text{ or} \qquad \text{Equation 1}$$

$$\min_u \Phi(u) + \frac{\mu}{2}\|ARu - y\|_2^2 \qquad \text{Equation 2}$$

$\Phi(x)$ represents the choice of a regularization term and μ is the penalty parameter or the damping factor. If the vector u is sparse, $\Phi(u)$ may be chosen as the $l_1$-norm of the vector u. However, when the vector u includes pixel values of the video frames, it may not be obvious in which basis u is sparse, and further, in which basis, u has the most sparseness.

The embodiments may use the minimum spatial total variation of time domain DCT coefficients of the original video frame as the regulation term, which is provided in the following equation $\Phi(u) = TV_s(DCT_t(u))$, as shown above. $DCT_t(u)$ represents the pixel wise DCT in the temporal direction, and each frame consists of DCT coefficients of a particular frequency. However, the embodiments encompass any other type of regulation term for use in the above minimization equation.

The video decoder 205 determines DCT coefficients in a temporal direction of the candidate video data, and determines the TV of the DCT coefficients on a frame-by-frame basis, where the video decoder 205 calculates the set of pixel values for the super display resolution according to a minimization of the TV of the DCT coefficients. This process is further explained in application Ser. No. 12/894,807. Also, the video decoder 205 may include a TV minimization solver (TVAL3) for solving Equation 1 or Equation 2, which is also further explained in application Ser. No. 12/897,807.

Referring to FIG. 5, the video decoder 105 reconstructs the video data according to the reduced display resolution based on the calculated pixel values. The components of u are the pixel values of the reconstructed video data. For example, the video frame can be formed from u by taking the components of u to form the pixels of the video frame column by column and then frame by frame. However, the embodiments encompass any type of method that reconstructs video frames (or a particular structure of a video frame such as video cubes or tubes) from a set of values. This process must be exactly the inverse of the process in which the vector x is formed from the video frame when the measurements are made.

The destination device 103 displays the video data or a portion thereof on the video display 206 having the super display resolution.

Variations of the example embodiments are not to be regarded as a departure from the spirit and scope of the example embodiments, and all such variations as would be apparent to one skilled in the art are intended to be included within the scope of this disclosure.

What is claimed:

1. A method for decoding video data by a decoder, the method including:
   receiving, by the decoder, a set of measurements, the set of measurements representing encoded video data, the encoded video data having original video data with original display resolution;
   determining, by the decoder, a super display resolution, the super display resolution being an enhanced resolution such that the super display resolution has a higher resolution than the original display resolution;
   determining, by the decoder, a reduction matrix based on at least a number of pixels for the determined super display resolution, the reduction matrix including a pattern of values, the reduction matrix having a size N×P, a value of N corresponds to a number of pixels for the original display resolution and a value of P corresponds to the number of pixels for the determined super display resolution, the value of P being greater than or equal to the value of N; and
   reconstructing, by the decoder, the video data or a portion of the video data using the determined reduction matrix and the received set of measurements such that the original display resolution or the portion of the original video data is enlarged to the determined super display resolution.

2. The method of claim 1, wherein the determining the super display resolution step determines the super display resolution according to requirements of a video display screen.

3. The method of claim 2, wherein the original display resolution is a common intermediate format (CIF) resolution and the determined super display resolution is a video graphics array (VGA) resolution.

4. The method of claim 1, wherein if the reconstruction step reconstructs the video data using the determined super display resolution, the determining a reduction matrix step determines the pattern of values for the reduction matrix based on a discrete cosine transform (DCT) of the original video data and a first identity matrix having the size N×P.

5. The method of claim 4, wherein the first identity matrix having the size N×P is formed by removing last P−N rows of a second identity matrix having size P×P.

6. The method of claim 1, wherein if the reconstruction step reconstructs the portion of the video data using the determined super display resolution, the determining a reduction matrix step determines the pattern of values for the reduction matrix based on a discrete cosine transform of the original video data having size $N_o \times N_o$ and a first identity matrix having size $N_z \times P_z$, where a value of $N_o$ corresponds to a number of pixels for a portion of the original video data not to be reconstructed according to the determined super display resolution, a value of $N_z$ corresponds to a number of pixels for a portion of the original video data to be reconstructed according to the determined super display resolution, and $P_z$ corresponds to a number of pixels of the portion of the video data to be reconstructed according to the determined super display resolution.

7. The method of claim 6, wherein the first identity matrix having the size $N_z \times P_z$ is formed by removing last $P_z - P_n$ rows of a second identity matrix of size $P_z \times P_z$.

8. The method of claim 1, further comprising:
   obtaining, by the decoder, a measurement matrix that was applied to the video data at an encoder, the measurement matrix including an assigned pattern of pixel values;
   calculating, by the decoder, pixel values for the determined super display resolution based on the measurement matrix, the reduction matrix and the received set of measurements.

9. An apparatus for decoding video data, the apparatus including:
   a decoder configured to receive a set of measurements, the set of measurements representing encoded video data, the encoded video data having original video data with an original display resolution,
   the decoder configured to determine a super display resolution, the super display resolution being an enhanced resolution such that the super display resolution has a higher resolution than the original display resolution,
   the decoder configured to determine a reduction matrix based on at least a number of pixels for the determined super display resolution, the reduction matrix including a pattern of values, the reduction matrix having a size N×P, a value of N corresponds to a number of pixels for the original display resolution and a value of P corresponds to the number of pixels for the determined super display resolution, the value of P being greater than or equal to the value of N, and
   the decoder configured to reconstruct the video data or a portion of the video data using the determined reduction matrix and the received set of measurements such that the original display resolution or the portion of the original video data is enlarged to the determined super display resolution.

10. The apparatus of claim 9, wherein the decoder determines the super display resolution according to requirements of a video display screen.

11. The apparatus of claim 10, wherein the original display resolution is a common intermediate format (CIF) resolution and the determined super display resolution is a video graphics array (VGA) resolution.

12. The apparatus of claim 9, wherein if the decoder reconstructs the video data using the determined super display resolution, the decoder determines the pattern of values for the reduction matrix based on a discrete cosine transform (DCT) of the original video data and a first identity matrix having the size N×P.

13. The apparatus of claim 12, wherein the first identity matrix having the size N×P is formed by removing last P−N rows of a second identity matrix having size P×P.

14. The apparatus of claim 12, wherein if the decoder reconstructs the portion of the video data using the determined super display resolution, the decoder determines the pattern of values for the reduction matrix based on a discrete cosine transform of the original video data having size $N_o \times N_o$ and a first identity matrix having size $N_z \times P_z$, where a value of $N_o$ corresponds to a number of pixels for a portion of the original video data not to be reconstructed according to the determined super display resolution, a value of $N_z$ corresponds to a number of pixels for a portion of the original video data to be reconstructed according to the determined super display resolution, and a value of $P_z$ corresponds to a number of pixels of the portion of the video data to be reconstructed according to the determined super display resolution.

15. The apparatus of claim 14, wherein the first identity matrix having the size $N_z \times P_z$ is formed by removing last $P_z - P_n$ rows of a second identity matrix of size $P_z \times P_z$.

16. The apparatus of claim 9, wherein
the decoder is configured to obtain a measurement matrix that was applied to the video data at an encoder, the measurement matrix including an assigned pattern of pixel values,
the decoder is configured to calculate pixel values for the determined super display resolution based on the measurement matrix, reduction matrix and the received set of measurements.

17. The method of claim 1, wherein the received set of measurements are encoded by applying a measurement matrix to the video signal.

* * * * *